United States Patent

[11] 3,568,007

[72] Inventor Jesse H. Miner
Falls Church, Va. (8616 McHenry St., Vienna, Va. 22180)
[21] Appl. No. 797,720
[22] Filed Jan. 21, 1969
[45] Patented Mar. 2, 1971

[54] FILTER AND SUBSTITUTE FOR RESONANT REED RELAY
11 Claims, 3 Drawing Figs.

[52] U.S. Cl. .......... 317/148.5, 329/126, 329/146
[51] Int. Cl. .......... H01h 47/32
[50] Field of Search .......... 307/295, 200, 260, 273, 233; 328/149, 165, 167; 329/102, 103, 101, 121, 123, 126; 317/123, 138, 147, 148.5; 330/30, 30 (D)

[56] References Cited
UNITED STATES PATENTS
3,473,133 3/1970 Hummel .......... 329/126
OTHER REFERENCES
Ryder, John D., Electronic Fundamentals and Application, 1964, Prentice-Hall, Inc. Englewood Cliffs, N. J. pages 546—548.

*Primary Examiner*—D. F. Duggan
*Assistant Examiner*—Ulysses Weldon
*Attorney*—Marvin Reich

ABSTRACT: A monostable multivibrator is connected to a differential amplifier to perform the following functions: signal limiter, band-pass filter, low-pass filter, high-pass filter and frequency modulation detector.

PATENTED MAR 2 1971 3,568,007

INVENTOR
JESSE H. MINER

BY

ATTORNEY

FILTER AND SUBSTITUTE FOR RESONANT REED RELAY

The invention relates to a filter and, more particularly, to a circuit which can simultaneously perform the following functions of band-pass filter, low-pass filter or high-pass filter, and frequency modulation detection.

For example, the desirability of providing separate circuits for providing a low-pass band filter, or a high-pass filter, a band-pass filter, and a frequency modulator detector has been established in the prior art. However, the circuits of the prior art for performing the aforementioned functions are generally separate and distinct circuits for each of the functions.

In accordance with the preferred form of the invention, a monostable multivibrator is utilized as a source of signals for a differential amplifier. The differential amplifier has three separate outputs; one for providing a low-pass band filter (or a high-pass band filter in a second embodiment); one for providing a band-pass output; and one for providing a frequency modulation detector output.

An object of the present invention is to provide a filter circuit for performing the following simultaneous functions: signal limiter, band-pass filter, low-pass filter and frequency modulation detector.

Another object of the present invention is to provide a filter circuit for performing the following functions simultaneously: signal limiter, band-pass filter, high-pass filter and frequency modulation detector.

A further object of the invention is to provide a circuit for performing the function of a resonant reed relay.

Other objects and many of the intended advantages of this invention will be readily appreciated as the same becomes better understood by reference to the following detailed description when considered in connection with the accompanying drawings, wherein.

Figure 1:
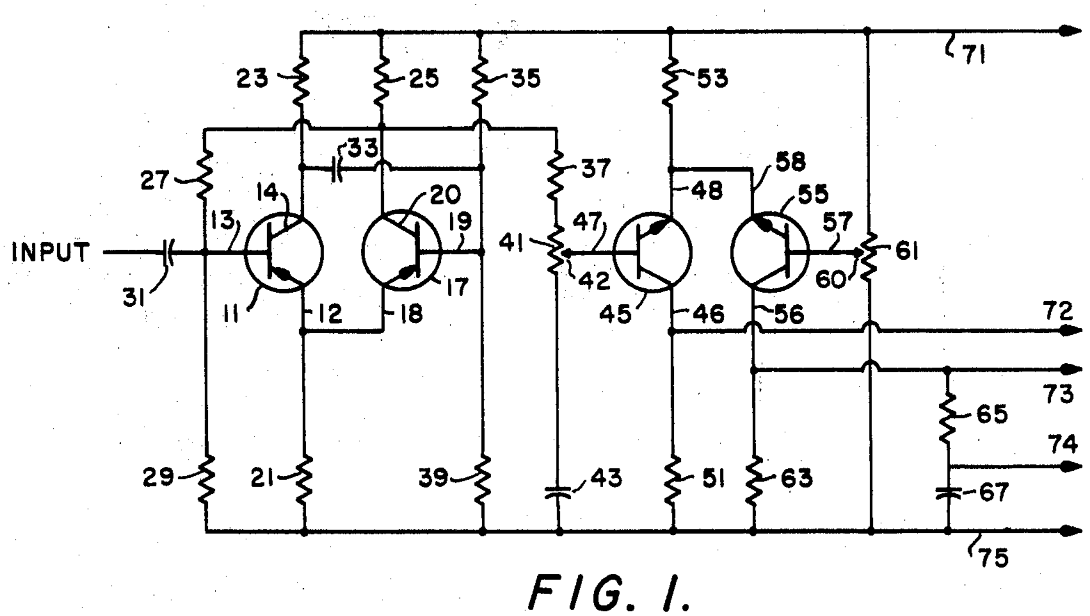
FIG. 1 is a circuit diagram of a filter in accordance with the present invention.

Referring to FIG. 1. An exemplary embodiment of the filter in accordance with the invention comprises a monostable multivibrator having a first transistor 11 provided with an emitter electrode 12, a base electrode 13 and a collector electrode 14 and a second transistor 17 having an emitter electrode 18, a base electrode 19 and a collector electrode 20. In this disclosure there are illustrated PNP-type transistor; however, NPN transistors may also be substituted by the mere expediency of changing the bias from a negative battery to a positive battery as is well known in the art. The emitter electrode 12 of the transistor 11 is connected to the emitter electrode 18 of the transistor 17. The collector electrode 14 of transistor 11 is connected through a resistor 23 to the common line 71 which is for connection to a source of negative potential. The base electrode 13 of transistor 11 is connected through resistor 27 to a resistor 25. The base electrode 13 of the transistor 11 is connected through the resistor 27 to the collector electrode 20 of the transistor 17. A resistor 29 is connected between the base electrode 13 of the transistor 11 and the ground connecting line 75.

The input signal is coupled to the base electrode 13 of transistor 11 through a capacitor 31. The collector electrode 14 of transistor 11 is connected through a capacitor 33 through the base electrode 19 of the transistor 17. The collector electrode 20 of the transistor 17 is connected through a resistor 25 to the line 71. The base 19 of the transistor 17 is connected through a resistor 35 to the line 71 and base 19 of transistor 17 is further connected through a resistor 39 to the ground line 75. The collector 20 of transistor 19 is connected through a resistor 37 to an end of a potentiometer 41. The other end of the potentiometer 41 is connected through capacitor 43 to the common ground line 75.

The NPN transistor 45 has its base electrode 47 connected to the center tap 42 of the potentiometer 41. The collector electrode 46 of the transistor 45 is connected through resistor 51 to the common ground line 75 and the emitter electrode 48 of the transistor 45 is connected through a resistor 53 to the line 71. A second NPN transistor 55 has its emitter electrode 58 directly connected to the emitter electrode 48 of the transistor 45. The collector electrode 56 of the transistor 55 is connected through a resistor 63 to the common ground line 75. The base electrode 57 of the transistor 55 is connected to the center tap 60 of a potentiometer 61. The potentiometer 61 has one of its ends connected to the common ground line 75 and its other end connected to the line 71. The collector electrode 56 is further connected to a series resistor 65 and capacitor 67. The free end of capacitor 67 is connected to the common ground line 75. As will be further evident hereinafter, a low-pass output is taken from the collector electrode 46 of the transistor 45 at the output terminal 72. The band-pass signal is taken from the collector electrode 56 of the transistor 55 from the output 73 and the frequency modulated detector output is taken from the junction of the resistor 65 and the capacitor 67. A source of B-voltage. which is not illustrated, is connected to the line 71.

The transistor 11 and 17 are the active components of a monostable multivibrator circuit. The transistor 17 is normally conducting while the transistor 11 is normally cut off or quiescent. The input signal is applied through the capacitor 31 to the base electrode 13 of transistor 11 and as the signal swings in the negative direction it starts to turn the transistor 11 on. Immediately, the regenerative feedback signal from the collector of transistor 17 causes the transistor 11 to saturate. The collector electrode 14 of the transistor 11 swings in the positive direction coupling a signal through the capacitor 33 to the base electrode 19 of the transistor 17. The signal cuts off transistor 17 for a period of time determined by the capacitance of capacitor 33 and the resistance in the base circuit of the transistor 17.

For the purpose of better understanding the invention, the following exemplary times and frequencies are given so that the invention can be more readily understood. It is emphasized, however, that the invention is not limited to these values which are hereinafter stated. Assuming for the circuit values of a given embodiment that the cutoff time is about .0001 second, which corresponds to one-half cycle of a 5kHz signal. Therefore, if the input signal were at the 5kHz rate, each side of the flip-flop would be turned on for about the same length of time during each cycle. Under this condition, the average voltage of the collector electrode 20 of transistor 17 would fall midway between the source voltage on line 71 and the voltage at the emitters 12 and 18 of the transistor 11 and 17, respectively. The voltage at the emitters of transistors 11 and 17 remains constant since both transistors carry about the same amount of current and one or the other of them is always turned on.

Now, let us assume that the input signal is at a frequency lower than 5kHz, then in this case, the time constant of the monostable multivibrator would be too short to equal half a cycle of the input signal and as a consequence, transistors 11 and 17 would return to their normal states ahead of time and await the next negative going input signal. Transistor 17 would be turned on for more than half the time during each cycle, and the average voltage at the collector of transistor 17 would be lower (less negative) than in the case where the input signal was at the 5kHz rate. It can be seen from this that the average voltage at the collector electrode 20 of transistor 17 is directly related to the input signal frequency. Because of the averaging caused by resistor 37, potentiometer 41 and capacitor 43, the average voltage at the collector 20 of transistor 17 will appear across the capacitor 43. This average voltage is applied as an operating bias to the base 47 of the transistor 45. The setting of the potentiometer 41 determines how much of the input frequency component is mixed with the bias voltage on capacitor 43. The transistors 45 and 55 are the active components of the differential input amplifier. The collector electrode 46 of the transistor 45 delivers the low-pass output signal while the collector electrode 56 of the transistor 55 delivers the band-pass output signal.

Since the average bias of the transistor 45 is determined by the input signal frequency, and since the bias of the transistor 45 and the transistor 55 must be approximately equal for both transistor 45 and transistor 55 to conduct, it can be seen that adjusting the potentiometer 61 has the effect of selecting the center frequency to which the band-pass filter will respond. The potentiometer 61 likewise determines the limit frequency for the low-pass output from the collector 46 of the transistor 45. Adjusting the potentiometer 41 has the effect of adjusting the passband of the signal at the collector 56 of the transistor 55. With potentiometer 41 adjusted so as to give a very small square wave input to the base electrode 47 of the transistor 45, the passband is determined largely by the voltage differential required to cut transistor 45 or 55 off. Larger input signals from the potentiometer 41 tend to override this consideration and enlarge the passband. Adjustment of the potentiometer 41 also slightly affects the limit frequency of the low-pass output signal.

The signal at the collector of transistor 55 is virtually indentical to the signal at the collector 20 of the transistor 17, having the same time relationships. Therefore, averaging the signal at the collector of transistor 55 with resistor 65 and capacitor 67 generates a signal at the frequency modulation detector output that is directly related to the input signal frequency. Because of this any frequency modulation inherent in the input signal will produce a variation in the DC voltage across capacitor 67. This DC variation constitutes the detected FM output signal. This signal may be amplified and applied to another low frequency electronic filter circuit if desired.

Since the cutoff time of transistor 17 is determined by the capacitance of capacitor 33 and the resistances in the base circuit of transistor 17, a variable capacitor may be used for the capacitor 33 to vary the cutoff time of the transistor 17 if desired. This would adjust the band-pass center frequency and could be used instead of the potentiometer 61. In this case, the potentiometer 61 could be replaced by two fixed resistors, or by retaining the potentiometer 61 and using a variable capacitor for the capacitor 33, the circuit could be adjusted to operate over a very wide frequency range in the order of 400 mHz.

In the circuit providing a low-pass filter output, transistor 45 would be turned on for those frequencies below the maximum frequency of the band-pass filter output. The current in transistor 45 would vary at the rate of the input signal frequency producing a signal at the collector 46 of transistor 45. This collector signal is the low-pass filter output signal.

Figure 2:
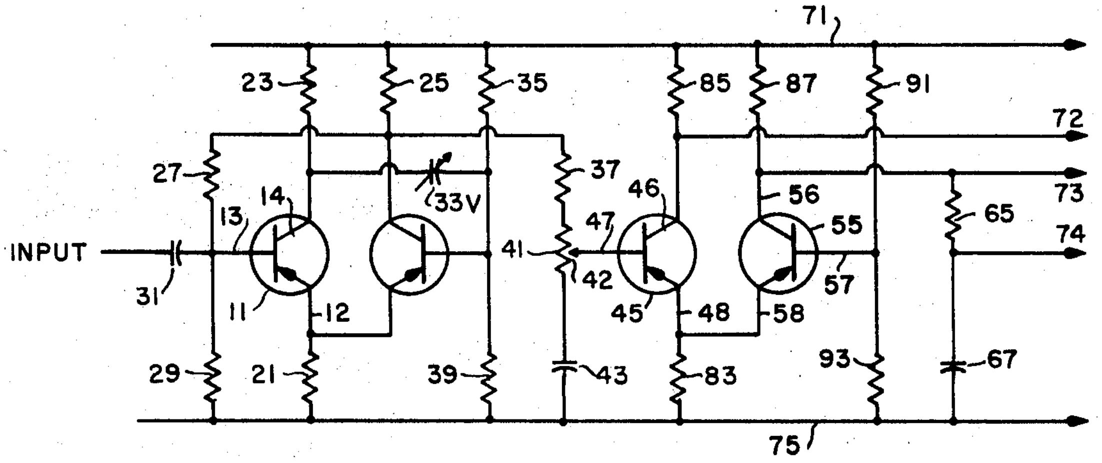
FIG. 2 is a circuit diagram of another filter forming an alternate embodiment of the present invention.

Referring to FIG. 2 which is an alternate embodiment of the invention, common components in FIG. 2 performing in the same way as their respective counterparts in FIG. 1, contain the same numerical indicia. In the multivibrator of FIG. 2, the capacitor 33 is shown as being a variable capacitor and therefore is labeled 33V. The potentiometer 61 has been replaced with two fixed resistors 91 and 93 in series with the base electrode 57 of the PNP transistor 55 connected to the junction of the resistors 91 and 93. The total resistance of resistors 91 and 93 is equal to the resistive value of the potentiometer 61. The common emitter-resistor 83 connected between the emitter 48 of the transistor 45 and the ground line 75 and has the same value as the resistor 53 of FIG. 1 used in the emitter circuit. The resistor 85 connected between the collector electrode 46 of the transistor 45 and the line 71 has the same numeric value as the resistor 61. The resistor 87 is connected between the collector electrode 56 of the transistor 55 and the line 71. The resistor 87 of FIG. 2 is equal in value to the resistor 63 in FIG. 1. The operation in FIG. 2 is approximately the same as the operation in FIG. 1 with the following noteworthy exceptions. In the circuit of FIG. 2, a high-pass filter output would be present at the collector electrode 46 of the PNP transistor 45. For those frequencies above the minimum frequency at the band-pass filter output, the current in transistor 45 would vary at the rate of input signal frequency producing a signal at the collector 46. This collector signal is the high-pass filter output signal. The band-pass filter signal is taken from the collector electrode 56 of the PNP transistor 55 and the frequency modulation detector signal is taken from the junction of the resistor 65 and the capacitor 67 (and in this embodiment, the resistor 65 is connected to the collector electrode 56 of the transistor 55).

When the circuit is used in a frequency modulation detector mode, input signal levels above the minimum required to trigger transistor 11 on would cause the same output signal. Therefore, if the circuit were used as a frequency modulation detector it would not be necessary to precede the transistor 11 with a signal limiter as is the custom with present frequency modulation detectors.

Figure 3:
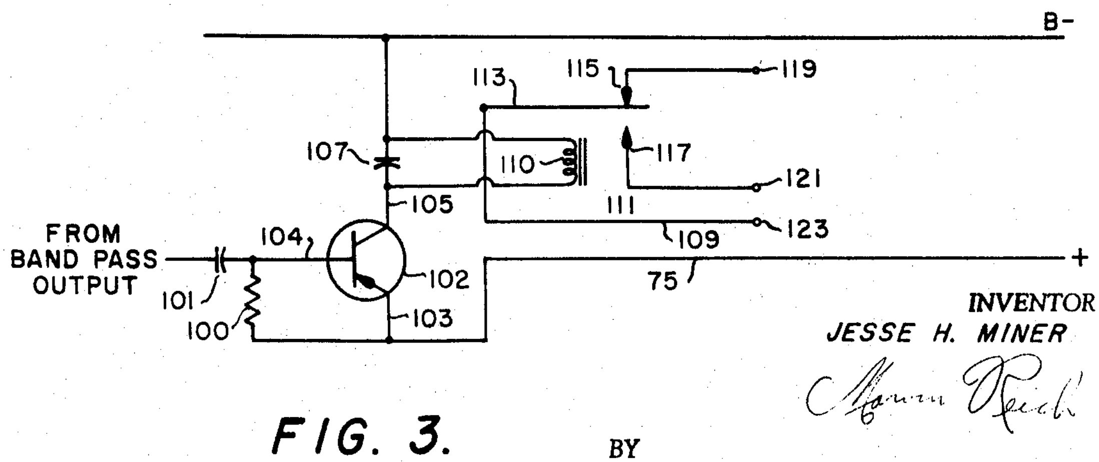
FIG. 3 is a circuit diagram of a circuit for adapting the present invention to perform as a resonant relay.

Referring to FIG. 3, there is shown a modification which enables the circuits of FIG. 1 or FIG. 2 to be utilized as a substitute for a resonant reed relay. A capacitor 101 is connected between the band-pass output connections 73 and the base electrode 104 of the transistor 102. The emitter electrode 103 of the transistor 102 is connected to the ground line 75. A resistor 100 is connected between the base electrode 104 of the transistor 103 and the common ground line 75. A capacitor 107 is connected between the collector electrode 105 of the transistor 102 and the source of B− potential. A relay 109 has its relay coil 110 connected across the capacitor 107. The relay has a moveable switch arm 113 which is connected alternately to the contacts 115 and 117. The contact 115 is connected to the output terminal 119. The contact 117 is connected to the output terminal 121 and the contact switch arm 113 is connected to the output terminal 123.

The operation of this circuit is as follows. Band-pass output signals from the filter circuit are coupled through the capacitor 101 to the base electrode 104 of the transistor 102. Negative excursions would turn the transistor 102 on charging the capacitor 107 and energizing the relay winding 110. During the positive signals excursions transistor 102 will be cut off and the charge on the capacitor 107 would hold the relay winding 110 in the energized condition. In the absence of a band-pass signal transistor 102 would be cut off allowing the capacitor 107 to discharge thereby allowing the relay to release.

Obviously, many modifications and variations of the present invention are possible in the light of the above teachings. It is therefore to be understood that within the scope of the appended claims the invention may be practiced otherwise than as specifically described.

I claim:

1. A filter circuit for simultaneously providing a plurality of outputs comprising means for producing a low-passband output, means for producing a band-pass output and said means for producing a low passband output and said means for producing a band-pass output comprising a monostable multivibrator having an input and an output and a differential amplifier having a first and second input and a first and a second output, said output of said monostable multivibrator being connected to said first input of said differential amplifier, a reference point, said second input of said differential amplifier connected to said reference point, said reference point having a signal which is not dependent on the input signal, whereby the low-passband is obtained from said first differential amplifier output and said band-pass output is taken from said second differential amplifier output.

2. A filter circuit for simultaneously providing a plurality of outputs comprising means for producing a high passband output, means for producing a band-pass output and said means for producing a high passband output and said means for producing a band-pass output comprising a monostable multivibrator having an input and an output and a differential amplifier having an input and a first and a second output, said output of said monostable multivibrator being connected to said input of said differential amplifier, whereby the high passband is obtained from said first differential amplifier output and said band-pass output is taken from said second differential amplifier output.

3. A filter circuit as defined in claim 2, but further characterized by having a means for producing a frequency modulated detector output comprising a resistor connected in series with a capacitor, said resistor being connected to said second output of said differential amplifier and said modulated detector output taken from the junction of said resistor and said capacitor.

4. A filter circuit as defined in claim 1, but further characterized by having a means for producing a frequency modulated detector output comprising a resistor connected in series with a capacitor, said resistor connected in series with a capacitor, said resistor being connected to said second output of said differential amplifier and said modulated detector output taken from the junction of said resistor and said capacitor.

5. A filter circuit as defined in claim 2, but further characterized by having an electronic switching means having an input and an output, a relay connected to said switching means output and said switching means input connected to said band-pass output whereby said filter circuit and said relay performs the functions of a resonant reed relay.

6. A filter circuit as defined in claim 1, but further characterized by having an electronic switching means having an input and an output, a relay connected to said switching means output and said switching means input being connected to said band-pass output whereby said filter circuit and said relay performs the functions of a resonant reed relay.

7. A filter circuit for simultaneously providing a plurality of different distinct output signals having different frequency characteristics comprising a monostable multivibrator having an input and an output, a differential amplifier having a first and second input and a first and second output, said first input of said differential amplifier being connected to the output of said monostable multivibrator means connected to said second input of said differential amplifier for varying the frequency midpoint of one of said output signals, and whereby said output signals are taken from the output of said differential amplifier.

8. A filter circuit as defined in claim 7, but further characterized by said monostable multivibrator comprising a pair of cross-coupled transistors and said differential amplifier comprises a pair of transistors having their emitters connected together at a common junction point.

9. A filter circuit as defined in claim 1 but further characterized by said multivibrator comprising a pair of cross-coupled transistors and said differential amplifier comprises a pair of transistors having their emitters connected together at a common junction.

10. A filter circuit as defined in claim 8, but further characterized by having an electronic switching means having an input and an output, a relay connected to said switching means output and said switching means input being connected to said second output of said differential amplifier whereby said filter circuit and said relay performs the functions of a resonant reed relay.

11. A filter for producing a plurality of outputs comprising a first and second transistor, each transistor having a base electrode, an emitter electrode and a collector electrode, said emitter electrodes being connected together, said first transistor base electrode coupled to said collector electrode of said second transistor, and said second transistor base electrode coupled to said collector electrode of said first transistor, a third and fourth transistor, said third and fourth transistor each having an input electrode, a control electrode and an output electrode, said input electrodes of said third and fourth transistors being connected together, said control electrode of said third transistor being coupled to said collector electrode of said second transistor, a resistive impedance being connected to said control electrode of said fourth transistor, said output electrode of said third transistor supplying a first output signal, a fifth transistor having a control electrode and an output electrode, said fifth transistor control electrode being connected to said output electrode of said fourth transistor, a relay, said relay being connected to said fifth transistor output electrode whereby said filter controls the operation of said relay causing said relay to simulate the function of a resonant reed relay.